(12) United States Patent
Susnjara et al.

(10) Patent No.: US 10,786,946 B2
(45) Date of Patent: Sep. 29, 2020

(54) APPARATUS AND METHODS FOR COMPRESSING MATERIAL DURING ADDITIVE MANUFACTURING

(71) Applicant: Thermwood Corporation, Dale, IN (US)

(72) Inventors: Kenneth J. Susnjara, Birdseye, IN (US); Scott G. Vaal, Jasper, IN (US); Brian S. Smiddy, Newburgh, IN (US)

(73) Assignee: Thermwood Corporation, Dale, IN (US)

( * ) Notice: Subject to any disclaimer, the term of this patent is extended or adjusted under 35 U.S.C. 154(b) by 242 days.

(21) Appl. No.: 15/703,634

(22) Filed: Sep. 13, 2017

(65) Prior Publication Data

US 2019/0077079 A1   Mar. 14, 2019

(51) Int. Cl.
*B29C 64/25* (2017.01)
*B29C 64/209* (2017.01)
(Continued)

(52) U.S. Cl.
CPC ............ *B29C 64/25* (2017.08); *B29C 64/118* (2017.08); *B29C 64/209* (2017.08);
(Continued)

(58) Field of Classification Search
CPC ..... B29C 64/25; B29C 64/118; B29C 64/246; B29C 64/209; B29C 64/218; B33Y 30/00;
(Continued)

(56) References Cited

U.S. PATENT DOCUMENTS 4,417,936 A * 11/1983 Gaffney ................ B29C 55/28
  156/145
5,195,228 A * 3/1993 Fukunaga ............... F16C 13/00
  492/56

(Continued)

FOREIGN PATENT DOCUMENTS

DE      10 2014 220082 A1    4/2016

OTHER PUBLICATIONS

International Search Report and Written Opinion for International Application No. PCT/US2018/041212, dated Oct. 26, 2018 (12 pages).

*Primary Examiner* — Seyed Masoud Malekzadeh
*Assistant Examiner* — Guy F Mongelli
(74) *Attorney, Agent, or Firm* — Bookoff McAndrews, PLLC

(57) ABSTRACT

Embodiments of the present disclosure are drawn to an additive manufacturing system, which may include a nozzle having an inlet for receiving a flowable material and an outlet for depositing the flowable material. An applicator head may surround at least a portion of a proximal region of the nozzle. The applicator head may include a housing, a cooling inlet for receiving a coolant into the housing, a cooling outlet configured to allow the coolant to exit the housing, and an air inlet. A roller may be mounted on the applicator head to one side of the outlet of the nozzle. The roller may include an air outlet, wherein a flow path connects the air inlet and the air outlet so that air enters the air inlet and exits the air outlet. The roller may also include a plurality of holes located on an external surface of the roller.

20 Claims, 5 Drawing Sheets

(51) Int. Cl.
    *B29C 64/218*     (2017.01)
    *B33Y 30/00*     (2015.01)
    *B29C 64/118*     (2017.01)
    *B29C 64/245*     (2017.01)
    *B33Y 40/00*     (2020.01)
    *B29K 105/00*     (2006.01)
    *B29K 101/12*     (2006.01)

(52) U.S. Cl.
    CPC .......... *B29C 64/218* (2017.08); *B29C 64/245* (2017.08); *B33Y 30/00* (2014.12); *B33Y 40/00* (2014.12); *B29K 2101/12* (2013.01); *B29K 2105/0058* (2013.01)

(58) Field of Classification Search
    CPC ................ B33Y 40/00; B29K 2101/12; B29K 2105/0058
    USPC ........................................................ 425/325
    See application file for complete search history.

(56) References Cited

U.S. PATENT DOCUMENTS

| | | | |
|---|---|---|---|
| 6,030,199 A | 2/2000 | Tseng | |
| 6,391,251 B1* | 5/2002 | Keicher | B05B 7/14 |
| | | | 419/7 |
| 7,731,816 B2 | 6/2010 | Oldani et al. | |
| 7,810,539 B2 | 10/2010 | Mischler et al. | |
| 8,151,854 B2 | 4/2012 | Oldani | |
| 8,534,338 B2 | 9/2013 | Oldani et al. | |
| 8,954,180 B2 | 2/2015 | Oldani | |
| 10,369,776 B2* | 8/2019 | Batchelder | B29C 64/20 |
| 2007/0044899 A1 | 3/2007 | Tingley | |
| 2008/0006017 A1 | 1/2008 | Rindels | |
| 2008/0267651 A1* | 10/2008 | Gruszczynski | G03G 15/2039 |
| | | | 399/69 |
| 2009/0314391 A1* | 12/2009 | Crump | B21C 33/02 |
| | | | 148/523 |
| 2010/0155985 A1* | 6/2010 | McAlea | B33Y 10/00 |
| | | | 264/113 |
| 2010/0200168 A1 | 8/2010 | Oldani et al. | |
| 2011/0031643 A1* | 2/2011 | Hache | B26D 7/10 |
| | | | 264/154 |
| 2013/0077997 A1* | 3/2013 | Hanson | G03G 13/00 |
| | | | 399/130 |
| 2013/0141491 A1* | 6/2013 | Krichtman | B41J 2/1714 |
| | | | 347/30 |
| 2013/0197683 A1 | 8/2013 | Zhang et al. | |
| 2015/0068372 A1* | 3/2015 | Abney | B26F 1/20 |
| | | | 83/13 |
| 2015/0136318 A1* | 5/2015 | Tiefel | B32B 38/0008 |
| | | | 156/272.8 |
| 2016/0009028 A1 | 1/2016 | Tjellesen | B29C 64/209 |
| | | | 425/375 |
| 2016/0190878 A1* | 6/2016 | Saari | H02K 1/20 |
| 2016/0271880 A1* | 9/2016 | Bheda | B29C 64/20 |
| 2016/0331442 A1* | 11/2016 | Scheller | A61B 18/1442 |
| 2016/0368214 A1* | 12/2016 | Sasaki | B29C 64/393 |
| 2017/0021565 A1* | 1/2017 | Deaville | B29C 70/382 |
| 2017/0050816 A1* | 2/2017 | Michler | B65H 20/12 |
| 2017/0129052 A1* | 5/2017 | Buller | B33Y 10/00 |
| 2017/0203504 A1* | 7/2017 | Johnson | B29C 64/106 |
| 2017/0217088 A1 | 8/2017 | Boyd, IV et al. | |
| 2018/0050502 A1 | 2/2018 | Oldani et al. | |

* cited by examiner

APPARATUS AND METHODS FOR COMPRESSING MATERIAL DURING ADDITIVE MANUFACTURING

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., three-dimensional (3D) printing.

BACKGROUND

Additive manufacturing techniques and processes generally involve the buildup of one or more materials, e.g., layering, to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is commonly known as 3D printing. One such process, commonly referred to as Fused Deposition Modeling (FDM), or Fused Layer Modeling (FLM), comprises melting a thin layer of thermoplastic material and applying this material in layers to produce a final part. This is commonly accomplished by passing a continuous, thin filament of thermoplastic material through a heated nozzle, or by passing thermoplastic material into an extruder, with an attached nozzle, which melts the thermoplastic material and applies it to the structure being printed, building up the structure. The heated material may be applied to the existing structure in layers, melting and fusing with the existing material to produce a solid finished part.

The filament used in the aforementioned process may be produced, for example, by using a plastic extruder. This plastic extruder may be comprised of a steel screw configured to rotate inside of a heated steel barrel. Thermoplastic material in the form of small pellets may be introduced into one end of the rotating screw. Friction from the rotating screw, combined with heat from the barrel, may soften the plastic, which may then be forced under pressure through a small round opening in a die that is attached to the front of the extruder barrel. In doing so, a string of material may be extruded, after which the extruded string of material may be cooled and coiled up for use in a 3D printer or other additive manufacturing system.

Melting a thin filament of material in order to 3D print an item may be a slow process, which may be suitable for producing relatively small items or a limited number of items. The melted filament approach to 3D printing may be too slow to manufacture large items. However, the fundamental process of 3D printing using molten thermoplastic materials may offer advantages for the manufacture of larger parts or a larger number of items.

A common method of additive manufacturing, or 3D printing, may include forming and extruding a bead of flowable material (e.g., molten thermoplastic), applying the bead of material in a strata of layers to form a facsimile of an article, and machining the facsimile to produce an end product. Such a process may be achieved using an extruder mounted on a computer numeric controlled (CNC) machine with controlled motion along at least the x-, y-, and z-axes. In some cases, the flowable material, such as, e.g., molten thermoplastic material, may be infused with a reinforcing material (e.g., strands of fiber or combination of materials) to enhance the material's strength.

The flowable material, while generally hot and pliable, may be deposited upon a substrate (e.g., a mold), pressed down, or otherwise flattened to some extent, and leveled to a consistent thickness, preferably by means of a tangentially compensated roller mechanism. The compression roller may be mounted in or on a rotatable carriage, which may be operable to maintain the roller in an orientation tangential, e.g., perpendicular, to the deposited material (e.g., bead or beads). In some embodiments, the compression roller may be smooth and/or solid. The flattening process may aid in fusing a new layer of the flowable material to the previously deposited layer of the flowable material. The deposition process may be repeated so that successive layers of flowable material are deposited upon an existing layer to build up and manufacture a desired component structure. In some instances, an oscillating plate may be used to flatten the bead of flowable material to a desired thickness; thus, effecting fusion to the previously deposited layer of flowable material. The deposition process may be repeated so that successive layers of flowable material are deposited upon an existing layer to build up and manufacture a desired component structure. When executed properly, the new layer of flowable material may be deposited at a temperature sufficient to allow the new layer of such material to melt and fuse with a previously deposited layer in order to produce a solid part.

In some instances, the process of 3D printing a part may involve a two-step process. For example, the process may utilize a large print bead to achieve an accurate final size and shape. This two-step process, commonly referred to as near-net-shape, may begin by printing a part to a size slightly larger than needed, then machining, milling, or routing the part to the final size and shape. The additional time required to trim the part to a final size may be compensated for by the faster printing process.

In the practice of the aforementioned process, some disadvantages have been encountered. Certain polymer materials, such as, e.g., polyphenylene sulfide, commonly called PPS, may process at higher temperatures and may exhibit an affinity for hot metal. This affinity may cause the polymer material to adhere to metal that has been heated above a certain temperature. The specific processing temperature used depends on the type of polymer being deposited, but generally if metal is heated to a temperature near the melting point of the polymer, the polymer may adhere to the metal. This characteristic, along with any adhesion that may occur, may interfere with the printing process. The oscillating plate and/or the compression roller, along with other similar metal devices, may heat up above a critical temperature when processing thermoplastic materials like PPS that run at a higher temperature. This may cause adhesion and buildup of the thermoplastic materials on the oscillating plate and/or compression roller. This adhesion and/or buildup may disrupt or even halt the additive manufacturing printing process altogether.

SUMMARY

Aspects of the present disclosure relate to, among other things, methods and apparatus for fabricating components via additive manufacturing, such as, e.g., 3D printing techniques. Each of the aspects disclosed herein may include one or more of the features described in connection with any of the other disclosed aspects.

Exemplary embodiments of the present disclosure may be drawn to a compression roller that may absorb less heat while performing a compression function, and a compression roller that may allow for air cooling.

To accomplish these objectives, exemplary rollers may include small, shallow holes on an outer surface of the roller. For example, the holes may be drilled, molded, etched, or otherwise formed on the surface of the roller. Individual holes may be located in close proximity to one another. The diameter of the holes may be small enough so that the viscosity of the flowable material being compressed may cause the material to bridge the openings of the holes, rather than flow into the holes. Also, as exemplary rollers of the disclosure rotate, a small amount of air at ambient temperature may become trapped between the openings of the holes and the heated, deposited, flowable material (e.g., hot thermoplastic material). This trapped air may heat up rapidly, may expand in volume, and may create a biasing force against the hot material. As this expansion continues, the air may leak out from the holes toward adjacent holes, creating a thin layer of air between the surface of the roller (which may be metal) and the heated flowable material. This thin layer of air may act as an insulator to reduce the tendency of the roller (e.g., metal roller) to absorb heat from the flowable material being compressed.

In effect, the exemplary roller described above may reduce the transfer of heat from the heated deposited flowable material to the roller in at least two ways. First, much of the surface of the roller consists of holes. Instead of the deposited flowable material coming into direct contact with the roller, the flowable material may instead encounter the air trapped in the holes. Second, expanding air from the holes may create an insulating blanket that further reduces contact between the roller surface and the material being compressed, including portions of the roller surface that may not include holes.

The holes may also improve the ability to cool the roller by using air directed onto the compression roller surface, by increasing the surface area that is in contact with the air, and by replacing heated air that might be trapped in the holes after contacting the heated deposited flowable material with cooler air, preparing a portion of the roller for the next time the roller rotates around and that portion contacts the material again.

Embodiments of the present disclosure may be drawn to additive manufacturing systems. An exemplary additive manufacturing system may include a nozzle having an inlet for receiving a flowable material and an outlet for depositing the flowable material. The system may also include an applicator head surrounding at least a portion of a proximal region of the nozzle. The applicator head may include a housing, a cooling inlet for receiving a coolant into the housing, a cooling outlet configured to allow the coolant to exit the housing, and an air inlet. The system may further include a roller mounted on the applicator head to one side of the outlet of the nozzle. The roller may include an air outlet, wherein a flow path connects the air inlet and the air outlet so that air enters the air inlet and exits the air outlet. The roller may also include a plurality of holes located on an external surface of the roller.

In another exemplary embodiment of the present disclosure, an additive manufacturing system may include a nozzle having an outlet for depositing a flowable material. The system may also include an applicator head including a housing and an air inlet configured to allow air to enter the housing, wherein the nozzle extends through at least a portion of the applicator head. The system may also include a roller mounted on the applicator head to one side of the outlet of the nozzle. The roller may include at least one air outlet, wherein a flow path fluidly connects the air inlet and the at least one air outlet so that air that enters the air inlet and exits the at least one air outlet, and the at least one air outlet is oriented to direct the air onto a surface of the roller. The system may further include a plurality of holes spaced apart from one another on the surface of the roller, wherein the air forms a layer covering at least a portion of the surface of the roller when the roller compresses the flowable material deposited by the nozzle.

As used herein, the terms "comprises," "comprising," or any other variation thereof, are intended to cover a non-exclusive inclusion, such as a process, method, article, or apparatus. The term "exemplary" is used in the sense of "example," rather than "ideal."

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating components via additive manufacturing, such as, e.g., via 3D printing. Specifically, the methods and apparatus described herein may be drawn to a roller (e.g., a metal roller) that has one or more of the following features. The roller may absorb a reduced amount of heat when compressing a deposited flowable material (e.g., thermoplastic material). The exemplary roller may also (or alternatively) provide for air cooling of the roller. For example, the roller may include a flow path connecting an air inlet with an air outlet of the roller to allow air cooling of the heated roller during use.

For purposes of brevity, the methods and apparatus described herein will be discussed in connection with the fabrication of parts from thermoplastic materials. However, those of ordinary skill in the art will readily recognize that the disclosed apparatus and methods may be used with any flowable material suitable for additive manufacturing.

Figure 1:
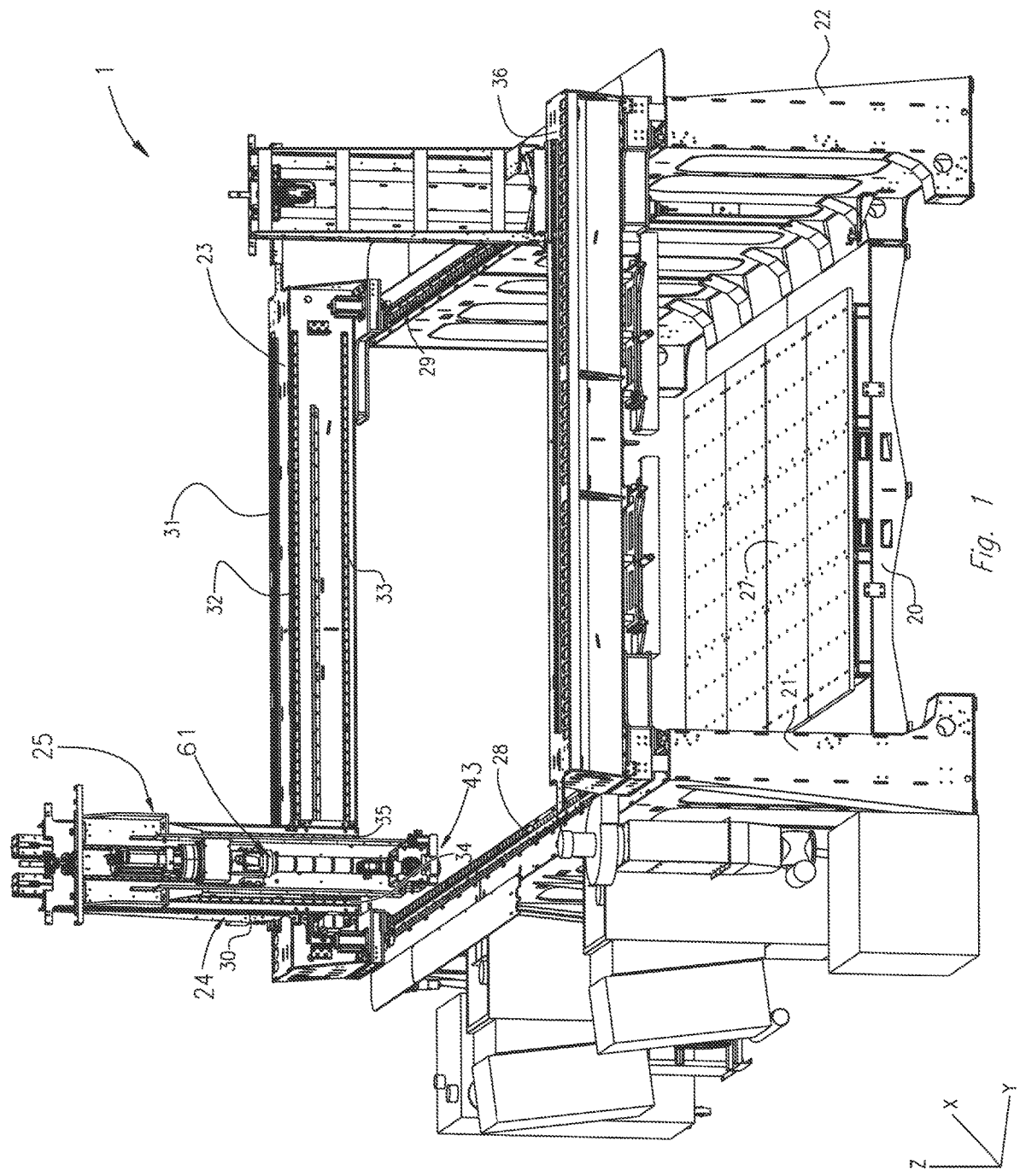
FIG. 1 is a perspective view of an exemplary CNC machine operable pursuant to an additive manufacturing process to form articles, according to an aspect of the present disclosure.

Referring to FIG. 1, there is illustrated a CNC machine 1 embodying aspects of the present disclosure. A controller (not shown) may be operatively connected to CNC machine 1 for displacing an application nozzle along a longitudinal line of travel, or x-axis, a transverse line of travel, or a y-axis, and a vertical line of travel, or z-axis, in accordance with a program inputted or loaded into the controller for performing an additive manufacturing process to form a desired component. CNC machine 1 may be configured to print or otherwise build 3D parts from digital representations of the 3D parts (e.g., AMF and STL format files) programmed into the controller.

For example, in an extrusion-based additive manufacturing system, a 3D part may be printed from a digital representation of the 3D part in a layer-by-layer manner by extruding a flowable material. The flowable material may be extruded through an extrusion tip or nozzle carried by a print head of the system, and the flowable material may be deposited as a sequence of beads or layers on a substrate in an x-y plane. The extruded, flowable material may fuse to a previously deposited layer of material and may solidify upon a drop in temperature. The position of the print head relative to the substrate may then be incrementally advanced along a z-axis (perpendicular to the x-y plane), and the process may then be repeated to form a 3D part resembling the digital representation.

Machine 1 shown in FIG. 1 includes a bed 20 provided with a pair of transversely spaced side walls 21 and 22, a printing gantry 23 and a trimming gantry 36 supported on opposing side walls 21 and 22, a carriage 24 mounted on printing gantry 23, a carrier 25 mounted on carriage 24, an extruder 61, and an applicator assembly 43 mounted on carrier 25. Located on bed 20 between side walls 21 and 22 is a worktable 27 provided with a support surface. The support surface may be disposed in an x-y plane and may be fixed or displaceable along an x-axis and/or a y-axis. For example, in a displaceable version, worktable 27 may be displaceable along a set of rails mounted on bed 20. Displacement of worktable 27 may be achieved using one or more servomotors and one or more of rails 28 and 29 mounted on bed 20 and operatively connected to worktable 27. Printing gantry 23 is disposed along a y-axis, supported on side walls 21 and 22. In FIG. 1, printing gantry 23 is mounted on a set of guide rails 28, 29, which are located along a top surface of side walls 21 and 22.

Printing gantry 23 may either be fixedly or displaceably mounted, and, in some aspects, printing gantry 23 may be disposed along an x-axis. In an exemplary displaceable version, one or more servomotors may control movement of printing gantry 23. For example, one or more servomotors may be mounted on printing gantry 23 and operatively connected to tracks, e.g., guide rails 28, 29, provided on the side walls 21 and 22 of bed 20.

Carriage 24 is supported on printing gantry 23 and is provided with a support member 30 mounted on and displaceable along one or more guide rails 31, 32, and 33 provided on printing gantry 23. Carriage 24 may be displaceable along a y-axis on one or more guide rails 31, 32, and 33 by a servomotor mounted on printing gantry 23 and operatively connected to support member 30. Carrier 25 is mounted on one or more vertically disposed guide rails 34 and 35 supported on carriage 24 for displacement of carrier 25 relative to carriage 24 along a z-axis. Carrier 25 may be displaceable along the z-axis by a servomotor mounted on carriage 24 and operatively connected to carrier 25.

Figure 2:
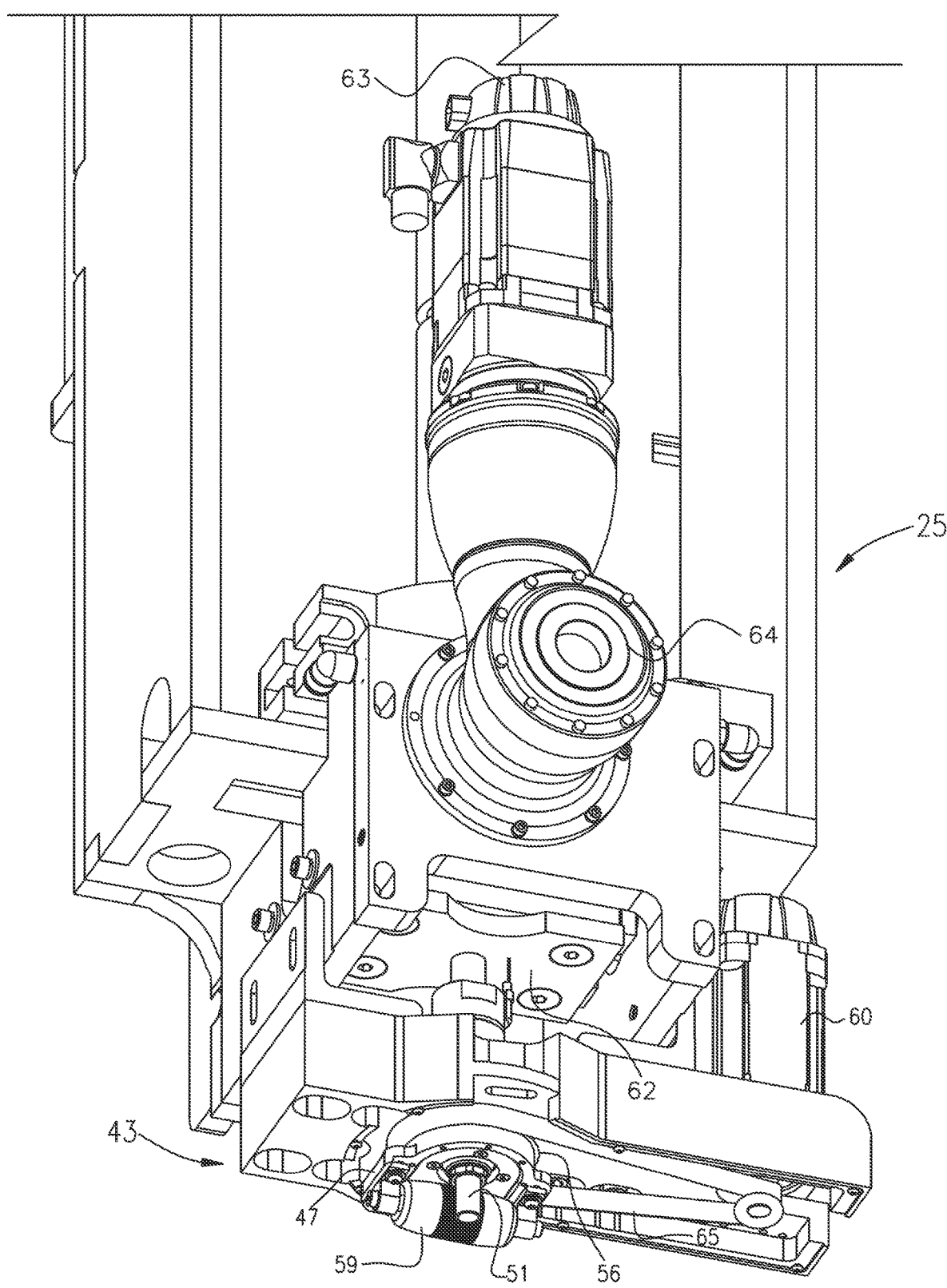
FIG. 2 is an enlarged perspective view of an exemplary carrier and applicator head assembly, including an exemplary roller, of the exemplary CNC machine shown in FIG. 1.
Figure 3:
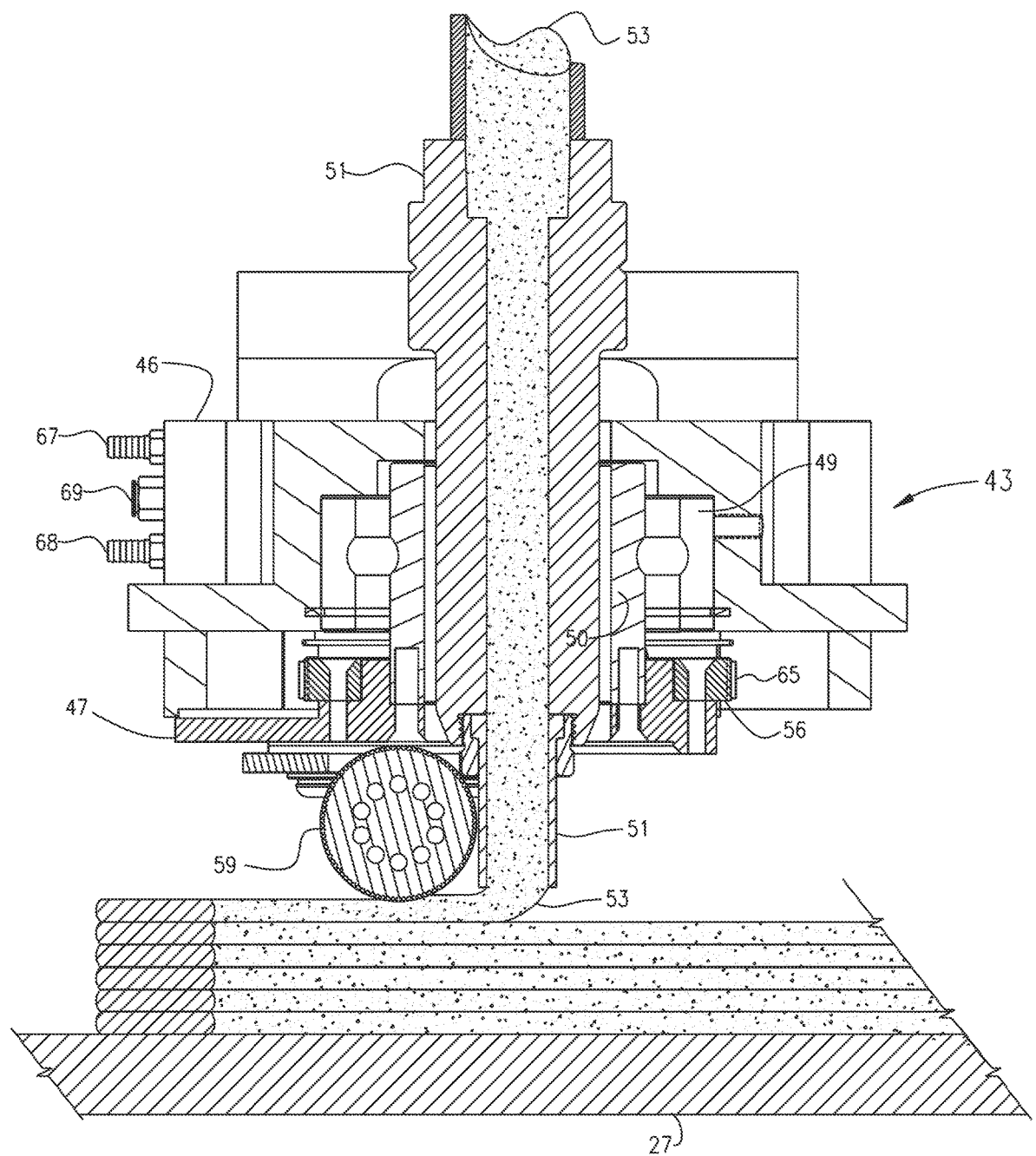
FIG. 3 is an enlarged cross-sectional view of an exemplary applicator head assembly, including an exemplary roller, shown in FIG. 2 during use.

As best shown in FIG. 2, mounted to the bottom of carrier 25 is a positive displacement gear pump 62, which may be driven by a servomotor 63, through a gearbox 64. Gear pump 62 may receive molten plastic from an extruder 61, shown in FIG. 1. A compression roller 59 for compressing deposited flowable material (e.g., thermoplastic material) may be mounted on a carrier bracket 47. Roller 59 may be movably mounted on carrier bracket 47, for example, rotatably or pivotably mounted. Roller 59 may be mounted so that a center portion of roller 59 is aligned with a nozzle 51, and roller 59 may be oriented tangential to nozzle 51. Roller 59 may be mounted relative to nozzle 51 so that material, e.g., one or more beads of flowable material (such as thermoplastic resins), discharged from nozzle 51 is smoothed, flattened, leveled, and/or compressed by roller 59, as depicted in FIG. 3. One or more servomotors 60 may be configured to move, e.g., rotationally displace, carrier bracket 47 via a pulley 56 and belt 65 arrangement. In some embodiments, carrier bracket 47 may be rotationally displaced via a sprocket and drive-chain arrangement (not shown), or by any other suitable mechanism.

With continuing with reference to FIG. 3, applicator head 43 may include a housing 46 with a roller bearing 49 mounted therein. Carrier bracket 47 may be mounted, e.g., fixedly mounted, to an adaptor sleeve 50, journaled in roller bearing 49. Roller bearing 49 may allow roller 59 to rotate about nozzle 51. As nozzle 51 extrudes material 53, roller bearing 49 may rotate, allowing roller 59 to rotate relative to nozzle 51 in order to follow behind the path of nozzle 51 to flatten deposited material 53 as nozzle 51 moves in different directions. As shown in FIG. 3, an oversized molten bead of a flowable material 53 (e.g., a thermoplastic material) under pressure from a source disposed on carrier 25 (e.g., one or more extruder 61 and an associated polymer or gear pump) may be flowed to applicator head 43, which may be fixedly (or removably) connected to, and in communication with, nozzle 51. In use, flowable material 53 (e.g., melted thermoplastic material) may be heated sufficiently to form a large molten bead thereof, which may be delivered through applicator nozzle 51 to form multiple rows of deposited material 53 on a surface of worktable 27. In some embodiments, beads of molten material deposited by nozzle 51 may be substantially round in shape prior to being compressed by roller 59. Exemplary large beads may range in size from approximately 0.4 inches to over 1 inch in diameter. For example, a 0.5 inch bead may be deposited by nozzle 51 and then flattened by roller 59 to a layer approximately 0.2 inches thick by approximately 0.83 inches wide. Such large beads of molten material may be flattened, leveled, smoothed, and/or fused to adjoining layers by roller 59. Each successive printed layer may not cool below the temperature at which proper layer-to-layer bonding occurs before the next layer is added.

In some embodiments, flowable material 53 may include a suitable reinforcing material, such as, e.g., fibers, that may facilitate and enhance the fusion of adjacent layers of extruded flowable material 53. In some aspects, flowable material 53 may be heated sufficiently to form a molten bead and may be delivered through nozzle 51 to form multiple rows of deposited flowable material onto a surface of worktable 27. In some aspects, flowable material 53 delivered onto a surface of worktable 27 may be free of trapped air, the rows of deposited material may be uniform, and/or the deposited material may be smooth. For example, flowable material 53 may be flattened, leveled, and/or fused to adjoining layers by any suitable means (e.g., roller 59), to form an article. In some embodiments, a tangentially oriented roller 59 may be used to compress flowable material 53 discharged from nozzle 51.

Although roller 59 is depicted as being integral with applicator head 43, roller 59 may be separate and discrete from applicator head 43. In some embodiments, roller 59 may be removably mounted to machine 1. For example, different sized or shaped rollers 59 may be interchangeably mounted on machine 1, depending, e.g., on the type of flowable material 53 and/or desired characteristics of the rows of deposited flowable material formed on worktable 27.

In some embodiments, machine 1 may include a velocimetry assembly (or multiple velocimetry assemblies) configured to determine flow rates (e.g., velocities and/or volumetric flow rates) of deposited flowable material 53 being delivered from applicator head 43. The velocimetry assembly may transmit signals relating to the determined flow rates to the aforementioned controller coupled to machine 1, which then may utilize the received information to compensate for variations in the material flow rates.

In the course of fabricating an article or component, pursuant to the methods described herein, the control system of machine 1, in executing the inputted program, may control several servomotors described above to displace gantry 23 along the x-axis, displace carriage 24 along the y-axis, displace carrier 25 along the z-axis, and/or rotate carrier bracket 47 about the z-axis while nozzle 51 deposits flowable material 53 and roller 59 compresses the deposited material. In some embodiments, roller 59 may compress flowable material 53 in uniform, smooth rows.

Housing 46 may include one or more barb fittings 67. Coolant may enter a barb fitting 67 and may be introduced inside of housing 46. An inlet portion of barb fitting 67 may be fluidly connected to a source of coolant (not shown). Once within housing 46, the coolant may absorb heat and may cool housing 46 as it flows within housing 46. Housing 46 may include one or more coolant paths (not shown), which may be disposed within housing 46 to direct the coolant within housing 46 during operation of machine 1, e.g., when printing a part. The coolant may exit from one or more barb fittings 68 and may return to a chiller to be cooled back down to an appropriate temperature. The coolant may be cooled down to a temperature below that at which deposited material 53 may begin to adhere to roller 59. This temperature may vary depending on the type of material 53 used and may be below the melting point of that material. In some examples, the coolant may be a liquid coolant, such as, e.g., water, antifreeze, ethylene glycol, diethylene glycol, propylene glycol, betaine, or any other suitable liquid coolants or combinations thereof.

Air may enter a quick disconnect 69, which may connect an interior region of housing 46 to an air source and/or to ambient air surrounding housing 46. The air entering quick disconnect 69 may cool down housing 46 as it flows within housing 46. In some embodiments, housing 46 may include one or more flow paths (not shown) to direct the flow of air within housing 46. The air may exit housing 46 from an outlet opening disposed on a bottom region of housing 46 onto roller 59 and/or through passageways in roller 59. In this manner, air exiting from the outlet opening may be used to cool roller 59. For example, air may be directed onto the outside of roller 59 to cool roller 59. Air may travel along a portion of an outer surface of roller 59 or along the entire outer surface of roller 59, cooling roller 59. In some embodiments, roller 59 may include one or more hollow, inner portions, and air may be directed within the hollow inner portion(s) to cool roller 59 from an inner surface. In some embodiments, air may be directed both onto the outer surface and along a hollow inner region of roller 59.

Figure 4:
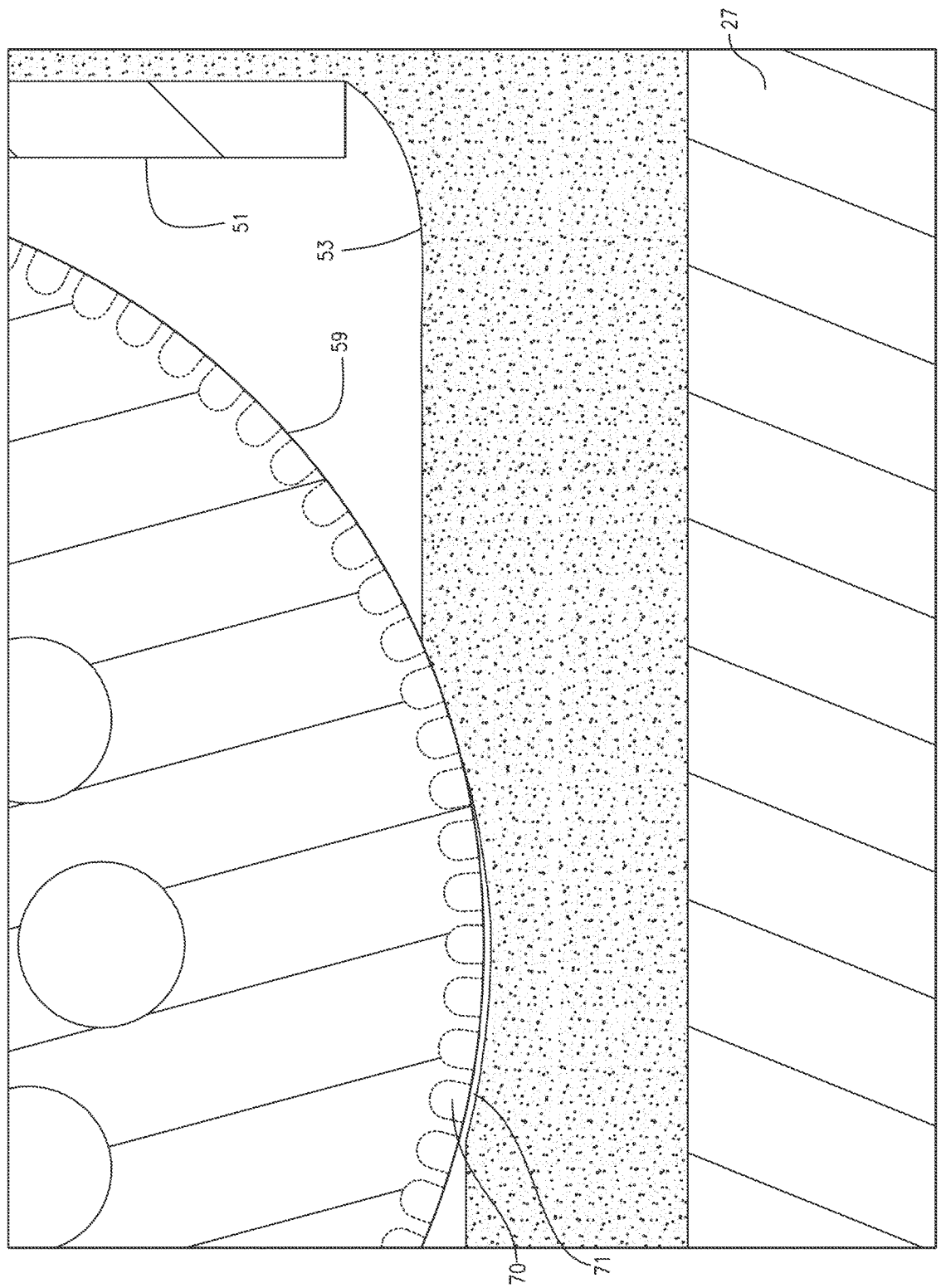
FIG. 4 is enlarged side view of the roller of the applicator head assembly of FIGS. 2 and 3 during use.

With reference now to FIG. 4, an enlarged, side view of roller 59 and nozzle 51 of applicator head 43 of FIG. 3 is shown. Further depicted is a layer of flowable material 53 (e.g., thermoplastic material) deposited by nozzle 51 on worktable 27. Roller 59 may include a plurality of small, shallow holes 70, which, in some embodiments, may be drilled, molded, etched, or otherwise formed on an outer surface of roller 59. Exemplary holes 70 may have a diameter of approximately 1/32 inch and may be approximately 1/32 inch deep, plus or minus 10%. Individual holes 70 may have a rounded bottom, and holes 70 may be close enough to one another that they almost touch. In some embodiments, individual holes 70 may be spaced 1/16 inch apart or less from each other, e.g., 1/32 inch or less away from each other. Holes 70 may be disposed on an outer surface of roller 59. Holes 70 may be located on a central region of roller 59, on the entire surface of roller 59, or may be located only on a portion of the surface of roller 59. Holes 70 may be disposed on the surface of roller 59 in close proximity to one another. In some embodiments, holes 70 may be spaced equidistant from each other, while in some embodiments, the distances between adjacent holes 70 may vary (for example, holes 70 may be closer together along a middle region or along an edge of the roller). During operation of machine 1, as roller 59 compresses deposited flowable material 53, the entire outer surface of roller 59 may contact deposited flowable material 53, or only a portion, e.g., a central region, of roller 59 may come in contact with deposited flowable material 53.

The diameter of holes 70 may be small enough so that the viscosity of deposited flowable material 53, when being compressed by roller 59, may cause deposited flowable material 53 to bridge the openings of holes 70 instead of flowing into holes 70. Also, as roller 59 rotates, a small amount of ambient air may become trapped between the openings of holes 70 and the deposited heated flowable material 53 (e.g., thermoplastic material). This trapped air may heat rapidly as it is exposed to heated flowable material 53, expanding in volume and creating an outward force against heated deposited flowable material 53. As this expansion continues, the air may leak from holes 70 toward adjacent holes 70, creating a thin layer of air 71 between the surface of roller 59 (which may be metal) and deposited flowable material 53, as depicted in FIG. 4. This thin layer of air 71 may act as an insulator, reducing the tendency of roller 59 (which may be metal) to absorb heat from flowable material 53 being compressed.

The transfer of heat from the heated flowable material 53 to roller 59 may, thus, be reduced. First, since the surface of roller 59 consists of holes 70, heated deposited flowable material 53 may not directly contact roller 59, or may contact less of roller 59, and instead may contact the air trapped in holes 70. Second, expanding air trapped in holes 70 may create an insulating blanket (e.g., thin layer of air 71) that may further reduce contact between flowable material 53 being compressed and the surface(s) of roller 59 not containing holes 70.

Figure 5A:
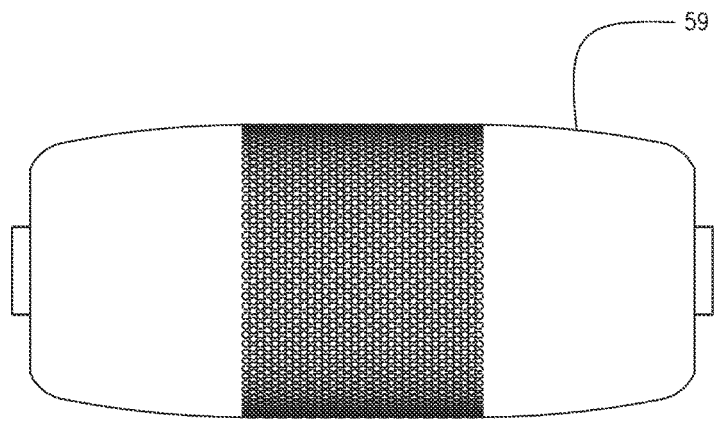
FIG. 5A depicts an exemplary roller, according to embodiments of the present disclosure.

FIG. 5A depicts an exemplary roller 59. Roller 59 may include a plurality of holes 70 drilled, molded, etched, or otherwise formed on an external surface. In some embodiments, roller 59 may include thousands of holes 70. Depending on the size of holes 70 and/or the size of roller 59, there may be between approximately 3,000 to approximately 15,000 holes included on roller 59. In the embodiment of FIG. 5A, holes 70 are located on a central region of roller 59. Additionally, roller 59 of FIG. 5A has a flattened profile in the central region on which holes 70 are located. The edges of roller 59 not including holes 70 slope in towards a central axis of the roller.

Holes 70 may promote cooling of roller 59 by using air that enters quick disconnect 69 during operation of machine 1. Air entering quick disconnect 69 may flow through housing 46 (e.g., freely or in one or more air passageways) and may exit through and/or onto roller 59. This air may be directed onto a surface of roller 59 to cool roller 59 after roller 59 absorbs heat from heated flowable material 53.

Holes 70 of roller 59 may also increase the surface area of roller 59 so that the air directed onto the surface of roller 59 may more efficiently cool the roller. Additionally, the air introduced onto the surface of roller 59 may replace heated air that may be in holes 70 after contacting the heated flowable material 53, thus swapping out the heated air with cooler air. In some embodiments, the cooler air may be the same temperature as ambient air surrounding machine 1. Through this process, roller 59 may be cooled as it rotates and comes into thermal contact with heated flowable material 53, preparing it for the next time the roller rotates around and contacts the material again.

Figure 5B:
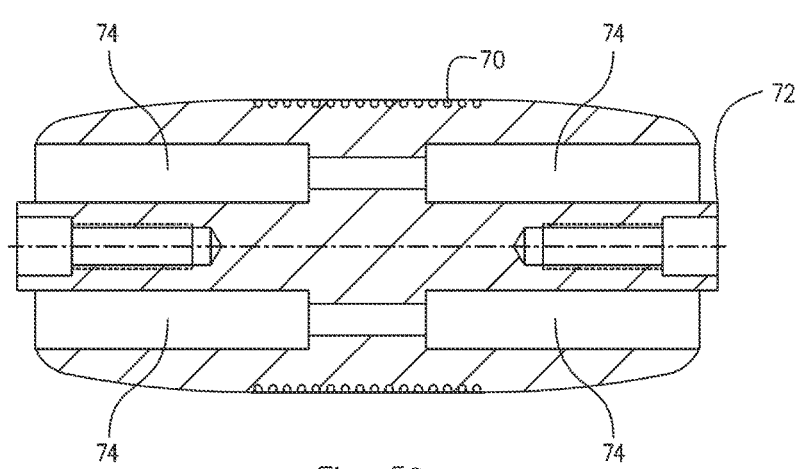
FIG. 5B is a cross-sectional view of the roller of FIG. 5A, according to embodiments of the present disclosure.
Figure 5C:
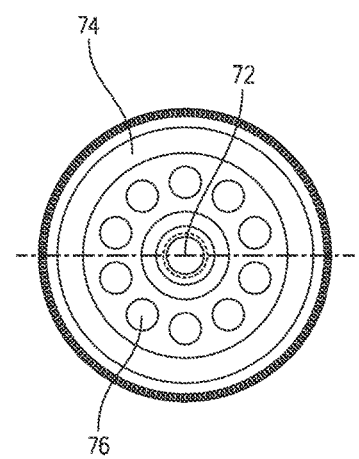
FIG. 5C is a side view of the roller of FIG. 5A, according to embodiments of the present disclosure.

As depicted in FIGS. 5B and 5C, some versions of roller 59 may include a hollow hub design. This hollow hub design may allow air to flow between an outer rim of roller 59 and a spindle 72. In some embodiments, an air outlet may direct air from quick disconnect 69 towards an at least partially hollow region between the outer rim of roller 59 and spindle 72, for example, into one or more hollow spaces 74. In some embodiments, hollow spaces 74 may be discrete, hollow portions of an internal region of roller 59, while in other embodiments, hollow spaces 74 may be fluidly connected to one another. As is shown in FIG. 5C, hollow space 74 may include a continuous hollow portion between spindle 72 and a radially outer rim of roller 59. In some embodiments, roller 59 may include one or more openings 76 through which air may exit hollow space(s) 74.

Moreover, the hollow hub design of roller 59 may contain less material than a solid roller. Solid rollers may retain comparatively more heat because of the increased amount of material (e.g., a roller made of solid metal may retain more heat than a metal roller with hollow interior regions). A roller with a hollow hub design may dissipate heat retained during operation of machine 1 better than a standard solid metal roller because of the increased surface area that may be exposed to cooler, ambient air.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the inventions described herein are not to be considered as limited by the foregoing description.

What is claimed is:

1. An additive manufacturing system, comprising:
   a nozzle having an inlet for receiving a flowable material and an outlet for depositing the flowable material;
   an applicator head connected to a printing gantry and surrounding at least a portion of the nozzle, wherein the applicator head comprises:
   a housing;
   a cooling inlet for receiving a coolant into the housing;
   a cooling outlet configured to allow the coolant to exit the housing; and
   an air inlet; and
   a roller mounted on and integral with the applicator head adjacent to the outlet of the nozzle, the roller and the nozzle being moveable with the applicator head such that the roller follows a path of the nozzle, wherein the roller comprises:
   an air outlet, wherein a flow path connects the air inlet and the air outlet so that air enters the air inlet and exits the air outlet;
   a plurality of holes located on an external circumferential surface of the roller and within a central region of the roller that overlaps the nozzle in a direction orthogonal to an axis of rotation of the roller; and
   sloped end portions, wherein the plurality of holes on the external circumferential surface of the roller are present in the central region of the roller.

2. The system of claim 1, wherein the plurality of holes on the central region of the roller extend partially through a radial thickness of the roller.

3. The system of claim 1, wherein the plurality of holes are spaced by a varying distance with respect to adjacent ones of the plurality of holes.

4. The system of claim 1, wherein at least one hole of the plurality of holes has a depth that falls within a range of $\frac{1}{32}$ inches, plus or minus 10% and a diameter that falls within a range of $\frac{1}{32}$ inches, plus or minus 10%.

5. The system of claim 1, wherein an air outlet of the applicator head is oriented to direct the air into an internal, hollow region of the roller and onto the external circumferential surface of the roller.

6. The system of claim 1, wherein the roller has a cross-sectional area that includes a hollow space.

7. The system of claim 1, wherein the housing includes at least one coolant path for guiding the coolant through the housing.

8. The system of claim 1, wherein the roller includes a plurality of air outlets.

9. An additive manufacturing system, comprising:
   a nozzle having an outlet for depositing a flowable material;
   an applicator head connected to a printing gantry and including a housing and an air inlet configured to allow air to enter the housing, wherein the nozzle extends through at least a portion of the applicator head; and
   a roller mounted on and integral with the applicator head adjacent to the outlet of the nozzle, the roller and the nozzle being moveable with the applicator head such that the roller follows a path of the nozzle, wherein the applicator head includes at least one air outlet, wherein a flow path fluidly connects the air inlet and the at least one air outlet so that air enters the air inlet and exits the at least one air outlet, and the at least one air outlet is oriented to direct the air onto an external circumferential surface of the roller; and
   wherein the roller includes:
   a plurality of holes spaced apart from one another on the external circumferential surface of the roller and provided within a central region of the roller that overlaps the applicator head in a direction orthogonal to an axis of rotation of the roller; and
   tapered end portions, wherein the plurality of holes on the external circumferential surface of the roller are present in the central region of the roller, wherein a portion of the air is retained in some of the holes when the roller compresses the flowable material deposited by the nozzle.

10. The system of claim 9, wherein the central region of the roller has a cylindrical cross-sectional shape, and wherein the holes extend partially through a radial thickness of the roller.

11. The system of claim 9, wherein the plurality of holes are spaced equidistant with respect to adjacent ones of the plurality of holes.

12. The system of claim 9, wherein at least one hole of the plurality of holes has a depth that falls within a range of $\frac{1}{32}$ inches, plus or minus 10% and a diameter that falls within a range of $\frac{1}{32}$ inches, plus or minus 10%.

13. The system of claim 9, wherein a first hole of the plurality of holes is spaced a distance of $\frac{1}{16}$ inch or less away from a second hole of the plurality of holes, where the first hole and the second hole are adjacent one another.

14. The system of claim 9, wherein the roller includes a hollow space, and wherein the at least one air outlet is oriented to direct the air towards the hollow space of the roller.

15. The system of claim 9, wherein the roller further comprises a plurality of air outlets, wherein at least one air outlet is oriented to direct the air onto the external circumferential surface of the roller.

16. The system of claim 9, wherein the applicator head further includes a cooling inlet and a cooling outlet for circulating a coolant through the housing.

17. The system of claim 1, wherein the roller is connected to a bracket that is rotatable by a pulley and a belt or by a sprocket and a drive-chain.

18. The system of claim 1, further including a velocimetry assembly configured to determine a flow rate of the flowable material.

19. The system of claim 1, wherein the housing forms an exterior surface of the applicator head, and wherein the cooling inlet includes a fitting that protrudes from the housing.

20. The system of claim 19, wherein the cooling outlet protrudes from the housing and is in fluid communication with the cooling inlet.

* * * * *